United States Patent
Hua et al.

(10) Patent No.: US 11,860,746 B2
(45) Date of Patent: Jan. 2, 2024

(54) RESILIENT DATA STORAGE SYSTEM WITH EFFICIENT SPACE MANAGEMENT

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 139 days.

(21) Appl. No.: 17/398,081

(22) Filed: Aug. 10, 2021

(65) Prior Publication Data

US 2023/0052811 A1 Feb. 16, 2023

(51) Int. Cl.
G06F 11/00 (2006.01)
G06F 11/20 (2006.01)
G06F 11/10 (2006.01)
G06F 11/14 (2006.01)

(52) U.S. Cl.
CPC ...... G06F 11/2094 (2013.01); G06F 11/1088 (2013.01); G06F 11/1092 (2013.01); G06F 11/1425 (2013.01)

(58) Field of Classification Search
CPC ............. G06F 11/1088; G06F 11/1092; G06F 11/1425; G06F 11/2094
See application file for complete search history.

(56) References Cited

U.S. PATENT DOCUMENTS

| | | | | |
|---|---|---|---|---|
| 11,314,608 B1* | 4/2022 | Hua | ...... | G06F 3/0689 |
| 11,327,668 B1* | 5/2022 | Hua | ...... | G06F 3/0659 |
| 11,474,901 B2* | 10/2022 | Hua | ...... | G06F 3/0619 |
| 2019/0370119 A1* | 12/2019 | Danilov | ...... | G06F 11/1088 |
| 2022/0113875 A1* | 4/2022 | Hua | ...... | G06F 3/0605 |

OTHER PUBLICATIONS

Dell EMC ECS Appliances, 2018, Dell Inc, all pages (Year: 2018).*

* cited by examiner

*Primary Examiner* — Marc Duncan
(74) *Attorney, Agent, or Firm* — ANDERSON GORECKI LLP (57) ABSTRACT

A storage system has a plurality of storage nodes having equal non-volatile storage capacity that is subdivided into equal size cells. Host application data that is stored in the cells is protected using RAID or EC protection groups each having members stored in ones of the cells and distributed across the storage nodes such that no more than one member of any single protection group is stored by any one of the storage nodes. Spare cells are maintained for rebuilding protection group members of a failed one of the storage nodes on remaining non-failed storage nodes so full data access is possible before replacement or repair of the failed storage node.

20 Claims, 11 Drawing Sheets

| node\cell | 1 | 2 | 3 | 4 | 5 | 6 |
|---|---|---|---|---|---|---|
| 1 | 1 | 2 | 3 | 4 | 5 |  |
| 2 | 1 | 2 | 3 | 4 | 5 | 6 |
| 3 | 1 | 2 | 3 | 4 | 6 |  |
| 4 | 1 | 2 | 3 | 6 | 5 |  |
| 5 | 1 | 2 | 6 | 4 | 5 |  |
| 6 | 1 | 6 | 3 | 4 | 5 |  |
| 7 | 6 | 2 | 3 | 4 | 5 |  |

Figure 3

| node\cell | 1 | 2 | 3 | 4 | 5 | 6 |
|---|---|---|---|---|---|---|
| 1 | 1 | 2 | 3 | 4 | 5 | |
| 2 | 1 | 2 | 3 | 4 | 5 | |
| 3 | 1 | 2 | 3 | 4 | 5 | |
| 4 | 1 | 2 | 3 | 4 | 5 | |
| 5 | 1 | 2 | 3 | 4 | 5 | |
| 6 | 1 | 2 | 3 | 4 | 5 | |
| 7 | | | | | | |

Figure 4A

| | 1 | 2 | 3 | 4 | 5 | 6 |
|---|---|---|---|---|---|---|
| 1 | 1 | 2 | 3 | 4 | 5 | |
| 2 | 1 | 2 | 3 | 4 | 5 | |
| 3 | 1 | 2 | 3 | 4 | | |
| 4 | 1 | 2 | 3 | | 5 | |
| 5 | 1 | 2 | | | 4 | 5 |
| 6 | 1 | | 3 | 4 | 5 | |
| 7 | | 2 | 3 | 4 | 5 | |

Figure 4B

| node\cell | 1 | 2 | 3 | 4 | 5 | 6 |
|---|---|---|---|---|---|---|
| 1 | 1 | 2 | 3 | 4 | 5 |   |
| 2 | 1 | 2 | 3 | 4 | 5 | 6 |
| 3 | 1 | 2 | 3 | 4 | 6 |   |
| 4 | 1 | 2 | 3 | 6 |   |   |
| 5 | 1 | 2 | 6 |   |   |   |
| 6 | 1 | 6 |   |   | 5 |   |
| 7 | 6 |   |   | 4 | 5 |   |
| 8 |   |   | 3 | 4 | 5 |   |
| 9 |   | 2 | 3 | 4 | 5 |   |

Figure 5A

| 1 | 2 | 3 | 4 | 5 | 6 |
|---|---|---|---|---|---|
| 1 | 2 | 3 | 4 | 5 |   |
| 1 | 2 | 3 | 4 | 5 | 6 |
| 1 | 2 | 3 | 4 | 6 | 7 |
| 1 | 2 | 3 | 6 | 7 | 8 |
| 1 | 2 | 6 | 7 | 8 |   |
| 1 | 6 | 7 | 8 | 5 |   |
| 6 | 7 | 8 | 4 | 5 |   |
| 7 | 8 | 3 | 4 | 5 |   |
| 8 | 2 | 3 | 4 | 5 |   |

Figure 5B

| node\cell | 1 | 2 | 3 | 4 | 5 | 6 |
|---|---|---|---|---|---|---|
| 1 | 1 | 2 | 3 | 4 | 5 |   |
| 2 | 1 | 2 | 3 | 4 | 5 | 6 |
| 3 | 1 | 2 | 3 | 4 | 6 |   |
| 4 | 1 | 2 | 3 | 6 | 5 |   |
| 5 | 1 | 2 | 6 | 4 | 5 |   |
| 6 | 1 | 6 | 3 | 4 | 5 |   |
| 7 | 6 | 2 | 3 | 4 | 5 |   |

Figure 6A

| | 1 | 2 | 3 | 4 | 5 | 6 |
|---|---|---|---|---|---|---|
| | 1 | 2 | 3 | 4 | 5 |   |
| | 1 | 2 | 3 | 4 | 5 | 6 |
| | 1 | 2 | 3 | 4 | 6 |   |
| | 1 | 2 | 3 | 6 | 5 |   |
| | 1 | 2 | 6 | 4 | 5 |   |
| | 1 | 6 | 3 | 4 | 5 |   |
| | 6 | 2 | 3 | 4 | 5 |   |

Figure 6B

| node\cell | 1 | 2 | 3 | 4 | 5 | 6 |
|---|---|---|---|---|---|---|
| 1 | 1 | 2 | 3 | 4 | 5 |  |
| 2 | 1 | 2 | 3 | 4 | 5 | 6 |
| 3 | 1 | 2 | 3 | 4 | 6 | 7 |
| 4 | 1 | 2 | 3 | 6 | 7 | 8 |
| 5 | 1 | 2 | 6 | 7 | 8 | 9 |
| 6 | 1 | 6 | 7 | 8 | 9 |  |
| 7 | 6 | 7 | 8 | 9 | 5 |  |
| 8 | 7 | 8 | 9 | 4 | 5 |  |
| 9 | 8 | 9 | 3 | 4 | 5 |  |
| 10 | 9 | 2 | 3 | 4 | 5 |  |

Figure 7A

| | 1 | 2 | 3 | 4 | 5 | 6 |
|---|---|---|---|---|---|---|
| | 1 | 2 | 3 | 4 | 5 |  |
| | 1 | 2 | 3 | 4 | 5 | 6 |
| | 1 | 2 | 3 | 4 | 6 | 7 |
| | 1 | 2 | 3 | 6 | 7 | 8 |
| | 1 | 2 | 6 | 7 | 8 | 9 |
| | 1 | 6 | 7 | 8 | 9 |  |
| | 6 | 7 | 8 | 9 | 5 |  |
| | 7 | 8 | 9 | 4 | 5 |  |
| | 8 | 9 | 3 | 4 | 5 |  |
| | 9 | 2 | 3 | 4 | 5 |  |

Figure 7B

| node\cell | 1 | 2 | 3 | 4 | 5 | 6 |
|---|---|---|---|---|---|---|
| 1 | 1 | 2 | 3 | 4 | 5 |  |
| 2 | 1 | 2 | 3 | 4 | 5 | 6 |
| 3 | 1 | 2 | 3 | 4 | 6 | 7 |
| 4 | 1 | 2 | 3 | 6 | 7 | 8 |
| 5 | 1 | 2 | 6 | 7 | 8 | 9 |
| 6 | 1 | 6 | 7 | 8 | 9 |  |
| 7 | 6 | 7 | 8 | 9 | 5 |  |
| 8 | 7 | 8 | 9 | 4 | 5 |  |
| 9 | 8 | 9 | 3 | 4 | 5 |  |
| 10 | 9 | 2 | 3 | 4 | 5 |  |

| node\cell | 1 | 2 | 3 | 4 | 5 | 6 |
|---|---|---|---|---|---|---|
| 11 | 10 | 11 | 12 | 13 | 14 |  |
| 12 | 10 | 11 | 12 | 13 | 14 | 15 |
| 13 | 10 | 11 | 12 | 13 | 15 | 16 |
| 14 | 10 | 11 | 12 | 15 | 16 | 17 |
| 15 | 10 | 11 | 15 | 16 | 17 |  |
| 16 | 10 | 15 | 16 | 17 | 14 |  |
| 17 | 15 | 16 | 17 | 13 | 14 |  |
| 18 | 16 | 17 | 12 | 13 | 14 |  |
| 19 | 17 | 11 | 12 | 13 | 14 |  |

RESILIENT DATA STORAGE SYSTEM WITH EFFICIENT SPACE MANAGEMENT

TECHNICAL FIELD

The subject matter of this disclosure is generally related to electronic data storage, and more particularly to protection groupings and failure recovery in a storage system.

BACKGROUND

Storage architectures include but are not limited to storage area networks (SANs), and direct attached storage (DAS). In a traditional DAS system, a server is directly attached to local drives without an interconnecting network. The storage capacity in such an architecture is limited to the local drives, which can only be accessed by the server. The SAN architecture was developed because of inherent limitations of the traditional DAS architecture. A SAN is a block-based storage system that aggregates storage capacity from multiple drive arrays that can be accessed by multiple interconnected compute nodes. The compute nodes can be accessed by multiple host servers, each of which can be running a different host application. Different logical volumes of storage can be created from aggregated storage capacity for each host application. Because all of the drives in a SAN can be accessed by more than one of the interconnected compute nodes, data access is not lost when one of the compute nodes fails. In contrast, access to the drives managed by a failed DAS server may be lost until the failed server is repaired or replaced.

SUMMARY

In accordance with some aspects, a storage system comprises: a plurality of storage nodes each comprising at least one processor, volatile memory, and at least one non-volatile drive, wherein all of the storage nodes have equal non-volatile storage capacity that is subdivided into equal size cells; and a plurality of protection groups each having members stored in ones of the cells and distributed across the storage nodes such that no more than one member of any single protection group is stored by any one of the storage nodes.

In accordance with some aspects, a method implemented by a plurality of storage nodes each comprising at least one processor, volatile memory, and at least one non-volatile drive, wherein all of the storage nodes have equal non-volatile storage capacity comprises: subdividing the storage capacity into equal size cells; and creating a plurality of protection groups each having members stored in ones of the cells and distributed across the storage nodes such that no more than one member of any single protection group is stored by any one of the storage nodes.

In accordance with some aspects, an apparatus comprises: one of a plurality of storage nodes each comprising at least one processor, volatile memory, and at least one non-volatile drive, wherein all of the storage nodes have equal non-volatile storage capacity that is subdivided into equal size cells; and a plurality of protection groups each having members stored in ones of the cells of the one of the storage nodes such that no more than one member of any single protection group is stored by the one of the storage nodes.

All examples, aspects, implementations, and features mentioned in this disclosure can be combined in any technically possible way. Other aspects, features, and implementations may become apparent in view of the detailed description and figures.

DETAILED DESCRIPTION

The terminology used in this disclosure is intended to be interpreted broadly within the limits of subject matter eligibility. The terms "disk" and "drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Aspects of the invention will be described in the context of a DAS storage system. However, the invention is not limited to DAS storage systems.

Figure 1:
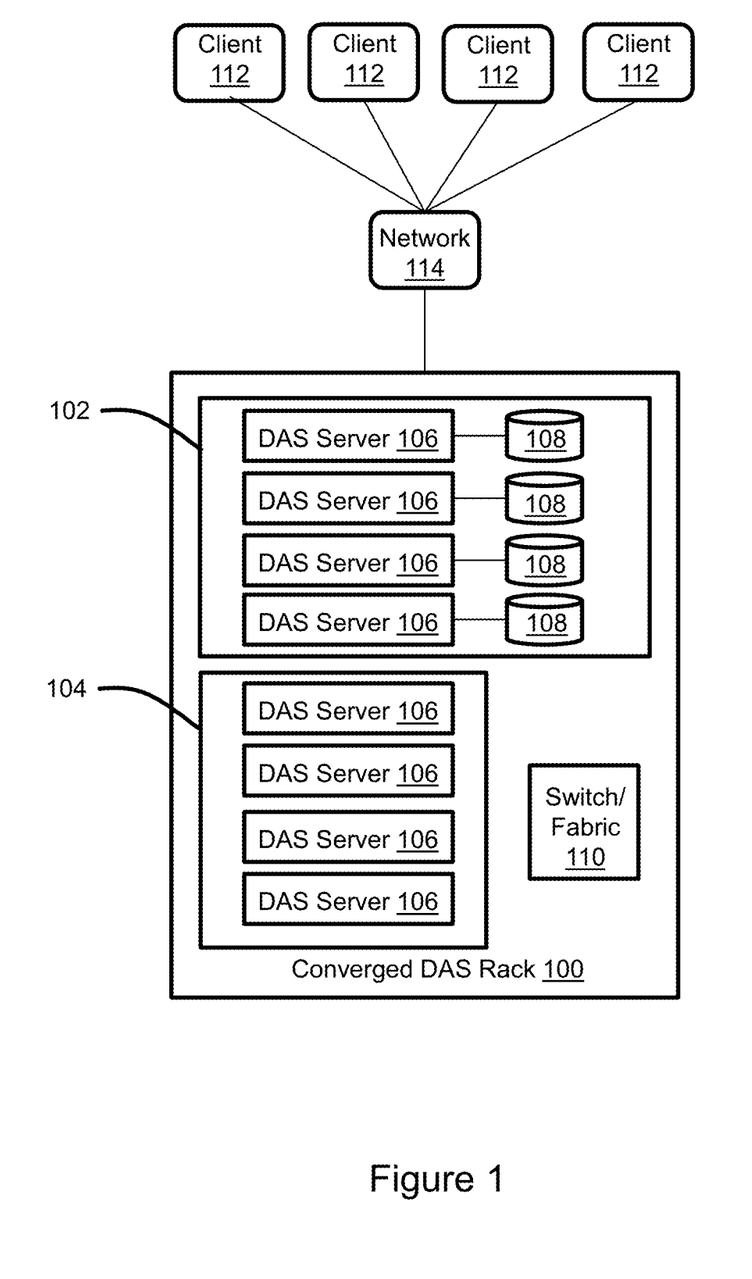
FIG. 1 illustrates a rack with converged, homogeneous, software-defined DAS nodes that are configured to rebuild the data of a failed storage node on remaining non-failed storage nodes.

FIG. 1 illustrates a rack 100 of converged, homogeneous, software-defined DAS nodes that are configured to rebuild the data of a failed storage node on remaining non-failed storage nodes. The rack will be described as a storage system although multiple racks could be interconnected and converged as a single storage system. A first group 102 of converged DAS storage nodes provides storage capacity. A second group 104 of converged DAS compute nodes provides compute capacity. Each converged DAS storage node is a DAS server 106 with specialized software components and associated attached non-volatile storage 108. Each converged DAS compute node is a DAS server 106 with specialized software components. All of the DAS servers 106 are interconnected via a switch/fabric 110. Host applications run on the DAS servers 106 of the second group 104 and use data stored on the non-volatile storage 108 of the first group 102. The host applications may provide business services to client computers 112 that are in communication with the rack 100 via a network 114. Examples of host applications may include, but are not limited to, software for email, accounting, sales, manufacturing, and inventory control. Although separate groups of converged DAS nodes that respectively provide compute and storage capacity are shown, those functions could be integrated into a single group of dual-function converged DAS nodes.

The DAS servers 106 may be identical, general purpose server computers. As is known in the art, server computers include processors and volatile memory. The processors may include central processing units (CPUs), graphics processing units (GPUs), or both. The volatile memory may include dynamic random-access memory (DRAM) of any kind. The non-volatile storage 108 may include one or more solid-state drives (SSDs), hard disk drives (HDDs), or both.

The DAS storage nodes, which are in the first group 102, are homogenous in the sense that they all have the same total non-volatile storage capacity. Moreover, that same-size storage capacity is organized into same-size cells, so each storage node has the same number of cells available for maintenance of host application data. The cells may be partitions or allocations, for example, and without limitation, and multiple drives may be abstracted as a single logical volume. As will be explained in greater detail below, the cells are used to store members of data protection groups such that no more than one member of any single protection group is stored by any one of the storage nodes. Thus, a member that becomes inaccessible due to storage node failure can be rebuilt using the remaining (accessible) members. Spare cells are maintained for rebuilding inaccessible members in the event of storage node failure. More specifically, in response to failure of one of the storage nodes, the protection group members that were stored in cells of that failed storage node are rebuilt in spare cells on the remaining non-failed storage nodes.

Figure 2:
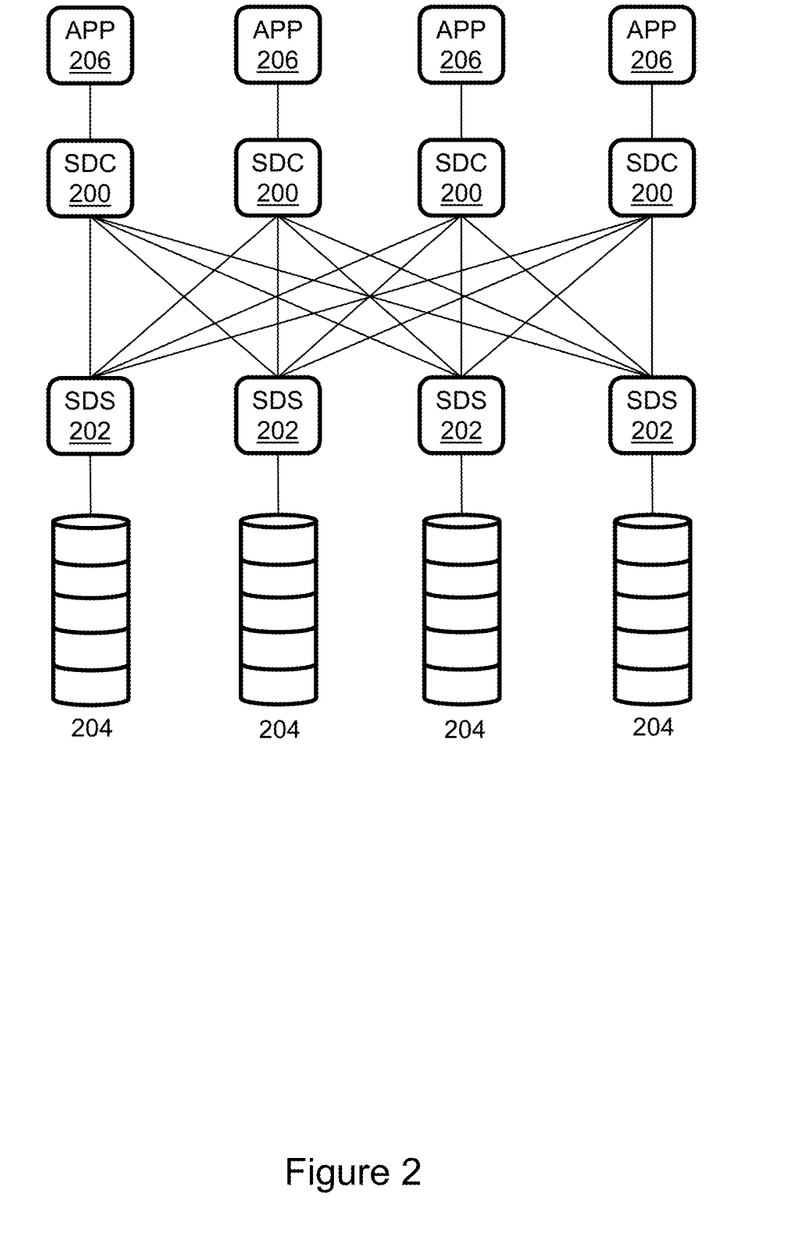
FIG. 2 illustrates software components of the converged DAS node rack storage system of FIG. 1.

FIG. 2 illustrates software components of the converged DAS storage system of FIG. 1. Each of the DAS nodes is converged in the sense that software components enable multiple data access paths so the rack functions as a single storage system. Storage data client (SDC) components 200 running on the DAS servers 106 of the second group 104 (compute nodes) provide the underlying operating system (OS) or hypervisor, and thus the host application instances 206, with access to logical blocks of data stored on logical volumes of storage 204 by sending data access commands to the DAS servers of the first group 102 (storage nodes). Storage data server (SDS) components 202 running on the DAS servers 106 of the first group 102 respond to the commands by accessing the non-volatile storage 108 that backs the logical volumes of storage 204. The SDS components also provide storage-related services such as creating and maintaining data protection groups and spares and responding to storage node failures. Resiliency is based on redundant array of independent disks (RAID) or erasure coding (EC) protection groups. Each protection group has D data members and P parity members, where the values of D and P depend on the RAID level or EC type that is implemented. A protection group width W=D+P. A failed parity member of a group is rebuilt by using the data members, and a failed data member of a group is rebuilt by using the parity members.

Figure 3:
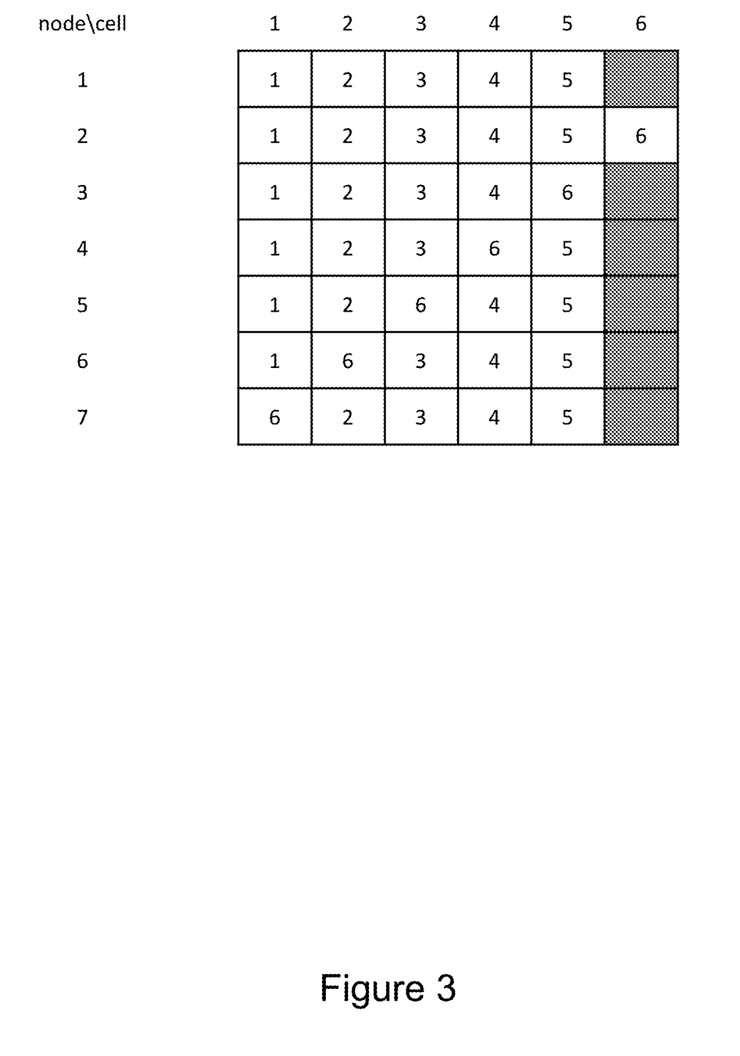
FIG. 3 illustrates a "minimal configuration" of the converged DAS node rack storage system of FIG. 1 with spares.

FIG. 3 illustrates a "minimal configuration" of the converged DAS node rack storage system of FIG. 1 with spares. The total storage capacity of all non-volatile storage in the rack is modeled as a matrix of indexed storage nodes and indexed cells. Only one member per protection group can be located on the non-volatile storage of any single storage node, so the members of each protection group are stored in W cells that are distributed across W storage nodes. Spare cells are reserved so that protection group members on a failed storage node can be rebuilt on non-failed storage nodes. A minimum of W+1 nodes are required to maintain one node's worth of spare cells to enable recovery from a single storage node failure. W protection groups are created in the minimal configuration, where W−1 protection groups have members distributed vertically, and one protection group has members distributed diagonally. With RAID-5 (5+1) or EC (4+2), for example, the protection group size W=6 and members of protection group 1 are distributed vertically in cell 1 of nodes 1 through 6, members of protection group 2 are distributed vertically in cell 2 of nodes 1 through 5 and 7, etc. Members of protection group 6 are distributed diagonally in cells 1 through 6 of nodes 7 through 2. The spare cells (unnumbered) are distributed in cell 6 of nodes 1 and 3 through 7.

Figure 4A:
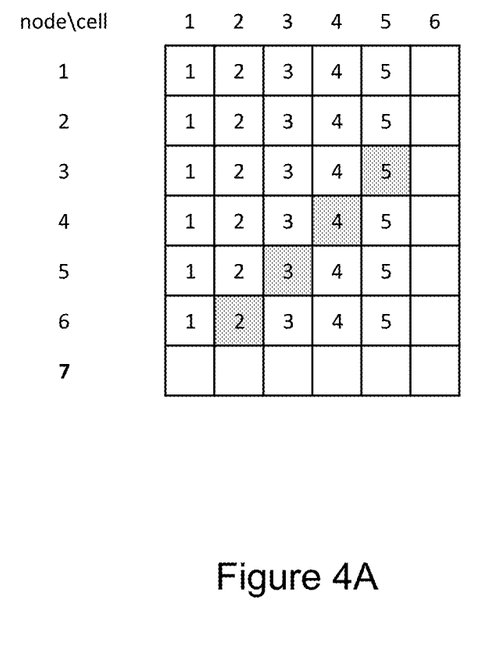
FIGS. 4A and 4B illustrate transformation of W−1 protection groups into the minimal configuration with spares.
Figure 4B:
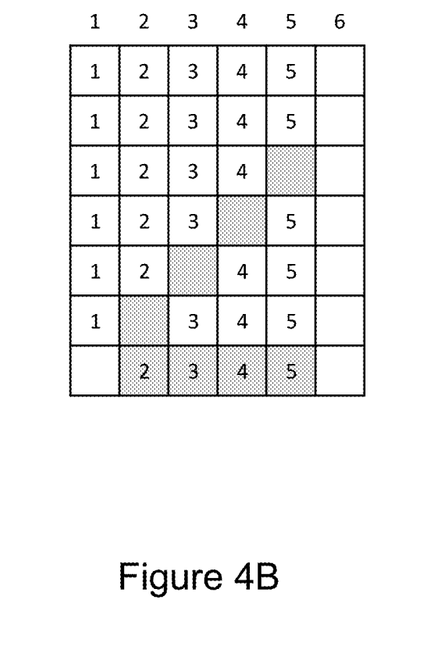

Referring to FIGS. 4A, and 4B, the minimal configuration is created from a simpler configuration with W−1 protection groups distributed vertically over W storage nodes, where the last cell per storage node is unused, as specifically shown in FIG. 4A. One protection group member from each vertically-oriented protection group (2 to W−1) is relocated to storage node W+1, thereby freeing cells for the diagonally-oriented protection group (6 in the illustrated example) as specifically shown in FIG. 4B. The transformation algorithm can be expressed as follows:

1. Add a new storage node N:
   N=W+1
   for (i=2; i<W; i++)
      node [N]. cell [i]=node [N+1−i]. cell [i]//relocate group member to new storage node.
2. Create a new protection group (W) using the diagonally-oriented cells.
3. Reserve the unused cells as spares.

Figure 5A:
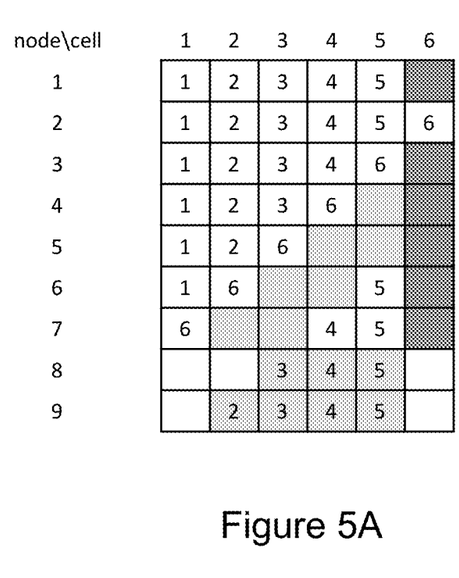
FIGS. 5A and 5B illustrate contemporaneous addition of multiple new storage nodes.
Figure 5B:
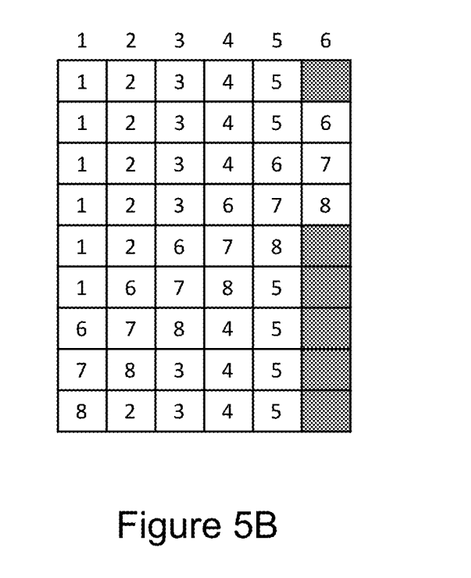

FIGS. 5A and 5B illustrate contemporaneous addition of multiple new storage nodes. New storage nodes can be added to the system individually using the transformation procedure described above to create new protection groups using diagonally-oriented cells that become free after relocating protection group members of the original (vertically distributed) protection groups. When contemporaneously adding multiple new storage nodes there will be W−2 protection group members moved to one storage node, W−3 protection group members moved to the next storage node, etc. Adding W−2 new storage nodes will incur a maximum data movement of (W−2)(W−1)/2 protection group members per Gauss' formula. Adding more than W−2 new storage nodes will incur the same amount of data movement as adding W−2 storage nodes. For example, two new groups 7 and 8 are created after two new storage nodes 8 and 9 are added, as shown in the figures. There are W spare cells (in last column) for recovery from a single storage node failure. The algorithm for adding K new storage nodes to M existing storage nodes can be expressed as follows:

1. N=Minimum (W−2, K)//whichever is smaller
    for (i=0; i<N; i++){
        A=i+2
        for (j=A; j<W; j++)
            node [M+K−i]. cell [j]=node [M+A−j]. cell [j]// relocate to new node
    }
2. Create K new protection groups using the diagonally-oriented cells.
3. Reserve the unused cells as spare cells.

Figure 6A:
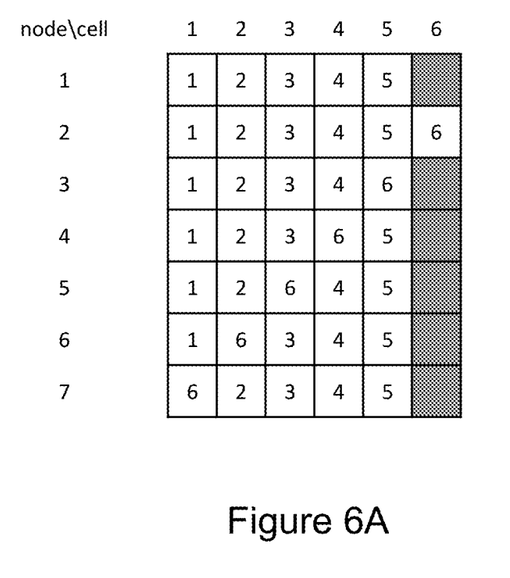
FIGS. 6A, 6B, 7A, and 7B illustrate storage node failure recovery.
Figure 6B:
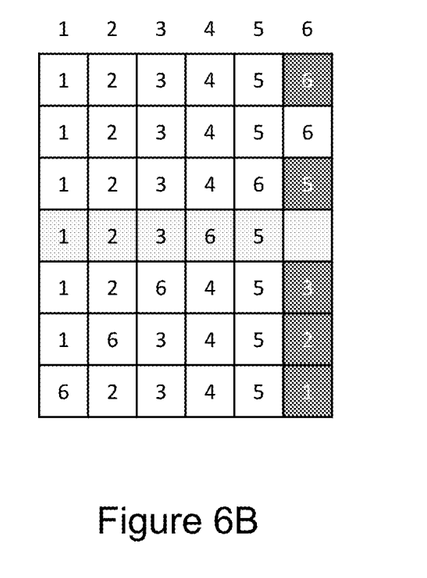

FIGS. 6A, 6B, 7A, and 7B illustrate storage node failure recovery. The existence of W spare cells is sufficient to rebuild the protection group members of any single storage node. However, some of the non-failed storage nodes already contain members of the same protection groups as the failed storage node so the protection group members must be rebuilt without locating multiple members of the same protection group on a single storage node. As shown in the simple example illustrated by FIGS. 6A and 6B, when storage node 4 fails, its protection group members 1, 2, 3, and 5 are rebuilt at spare cells on storage nodes 7, 6, 5, and 3 (in descending order), while its protection group member 6 is rebuilt on the spare cell on storage node 1. This is the only assignment of protection group members to spare node/cell combinations that satisfies the RAID/EC requirement that only one member per protection group can be located on any single storage node. The algorithm for assigning rebuilt members to spare cells can be expressed as follows:

1. Let N=the last storage node, and W=the first diagonally-oriented protection group.
2. Check protection group number (g) of each cell (from left to right) of the failed storage node:
    if (g<W) add protection group to list A;
    else add protection group to list Z.
3. List A will be naturally sorted with protection groups in ascending order.
4. Sort list Z so that the protection groups will be in descending order.
5. Create list L by appending list A to the end of list Z.
6. Create a list of spares (S) with the 1$^{st}$ spare from storage node 1, and subsequent spares from storage nodes N, N−1, N−2, etc.
7. Assign the spares of list S to the protection groups of list L in order: the 1$^{st}$ spare to the 1$^{st}$ protection group, the 2$^{nd}$ spare to the 2$^{nd}$ protection group, etc.

Figure 7A:
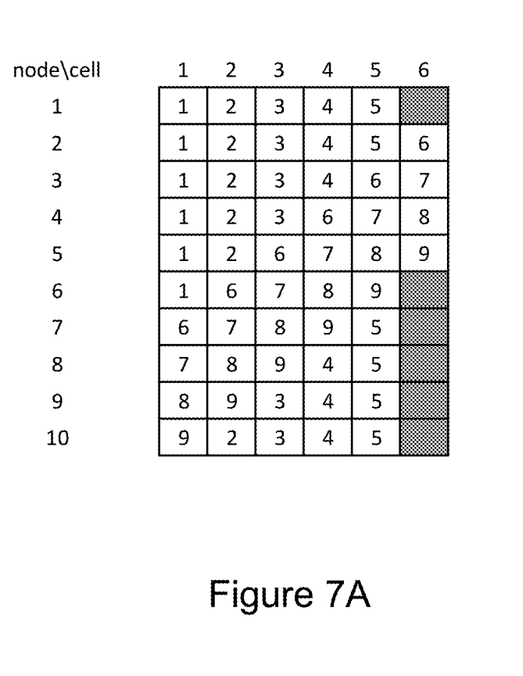
Figure 7B:
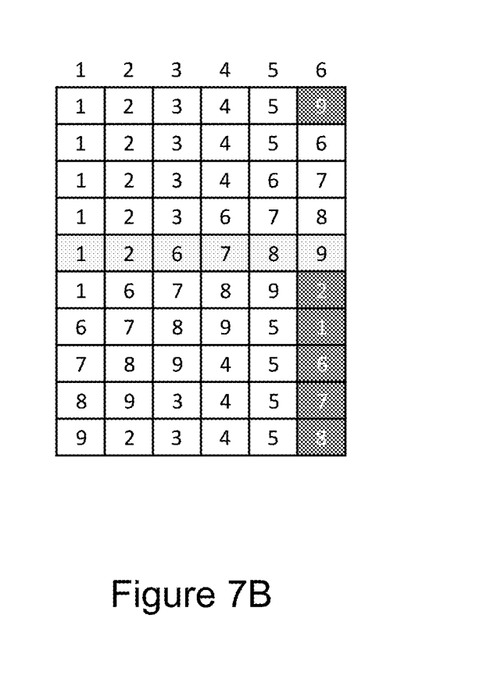

As shown in the more complex example illustrated by FIGS. 7A and 7B, when storage node 5 fails, list A=1, 2 and list Z={9, 8, 7, 6}. The combined list L={9, 8, 7, 6, 1, 2}. List S contains spare cells at storage nodes {1, 10, 9, 8, 7, 6}. As shown in FIG. 7B, the protection groups of List L are assigned to the spare cells of List S in order. After the rebuild, the system does not have spare capacity until the failed storage node is repaired or replaced, but RAID/EC protection prevents data loss from occurring due to another storage node failure. After the failed storage node is repaired or replaced, all rebuilt protection group members are moved back to their original (pre-rebuild) locations, and the spare capacity is restored.

Figure 8:
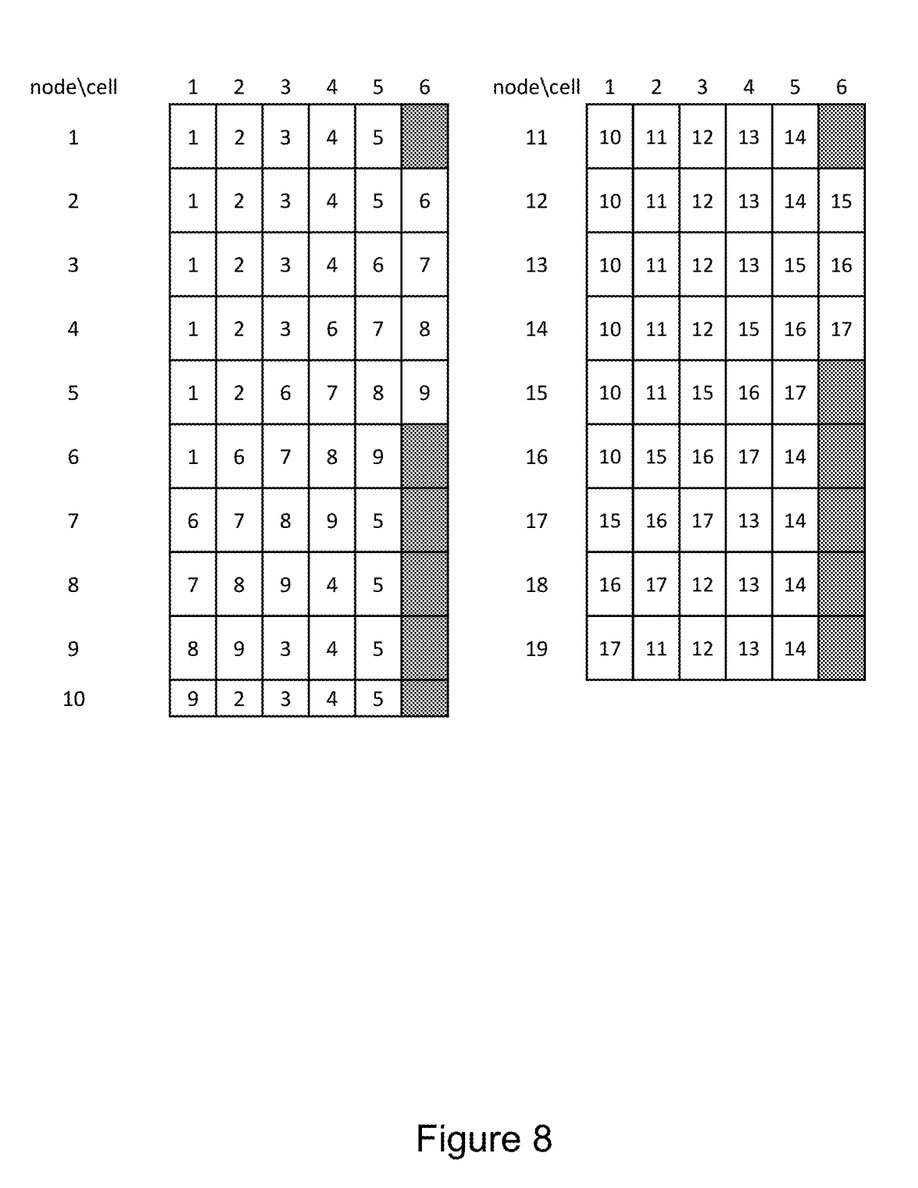
FIG. 8 illustrates addition of more spare capacity for greater resiliency.

FIG. 8 illustrates addition of more spare capacity for greater resiliency. The system is organized as independent subsets of storage nodes, where each storage node subset has enough spare cells to recover from one storage node failure. In the illustrated example, a first subset includes storage nodes 1 through 10 and a second subset includes storage nodes 11 through 19. If two storage nodes of the same subset are in a failed state at the same time, then the unused spare cells of a different subset may be shared for use in rebuilding the second failed storage node. Each storage node failure will consume the spares of just one subset.

Figure 9:
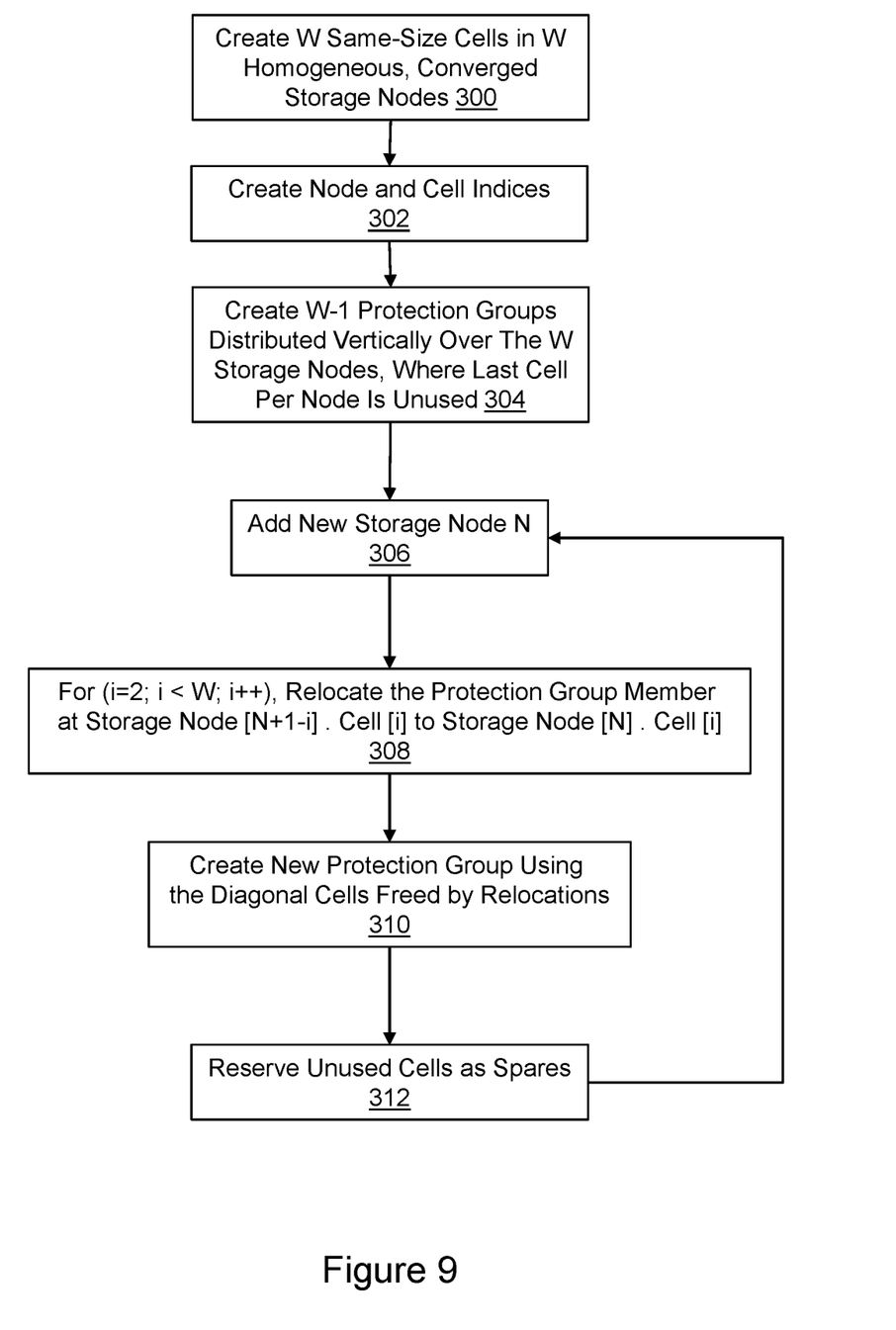
FIG. 9 illustrates a method for transforming a system with W−1 protection groups into a "minimal configuration" with spares and adding new storage nodes individually.

FIG. 9 illustrates a method for transforming a system with W−1 protection groups into a "minimal configuration" with spares and adding new storage nodes individually. Step 300 is creating W same-size cells in W homogeneous, converged DAS storage nodes, where W=D+P. Step 302 is creating node and cell indices, thereby enabling the storage to be modeled as a W-by-W matrix of storage node and cell combinations. Step 304 is creating W−1 protection groups that are distributed vertically over the W storage nodes, where the last cell per node is unused. Step 306 is adding a new storage node N. Protection group members can then be selected and relocated. Step 308 is relocating the protection group members at storage node [N+1−i]. cell [i] to storage node [N]. cell [i] for incremental values of i that are less than W, starting with i=2. The result of the relocations is a group of diagonally oriented free cells. Step 310 is creating a new protection group in the diagonally-oriented free cells. The new protection group is assigned the next incremental index number, which will be W for the first new storage node. Step 312 is reserving the unused cells as spares. Steps 306 through 312 may be iterated for each new storage node but the addition of a single new storage node may suffice to transform a system with W−1 protection groups into a minimal configuration with spares.

Figure 10:
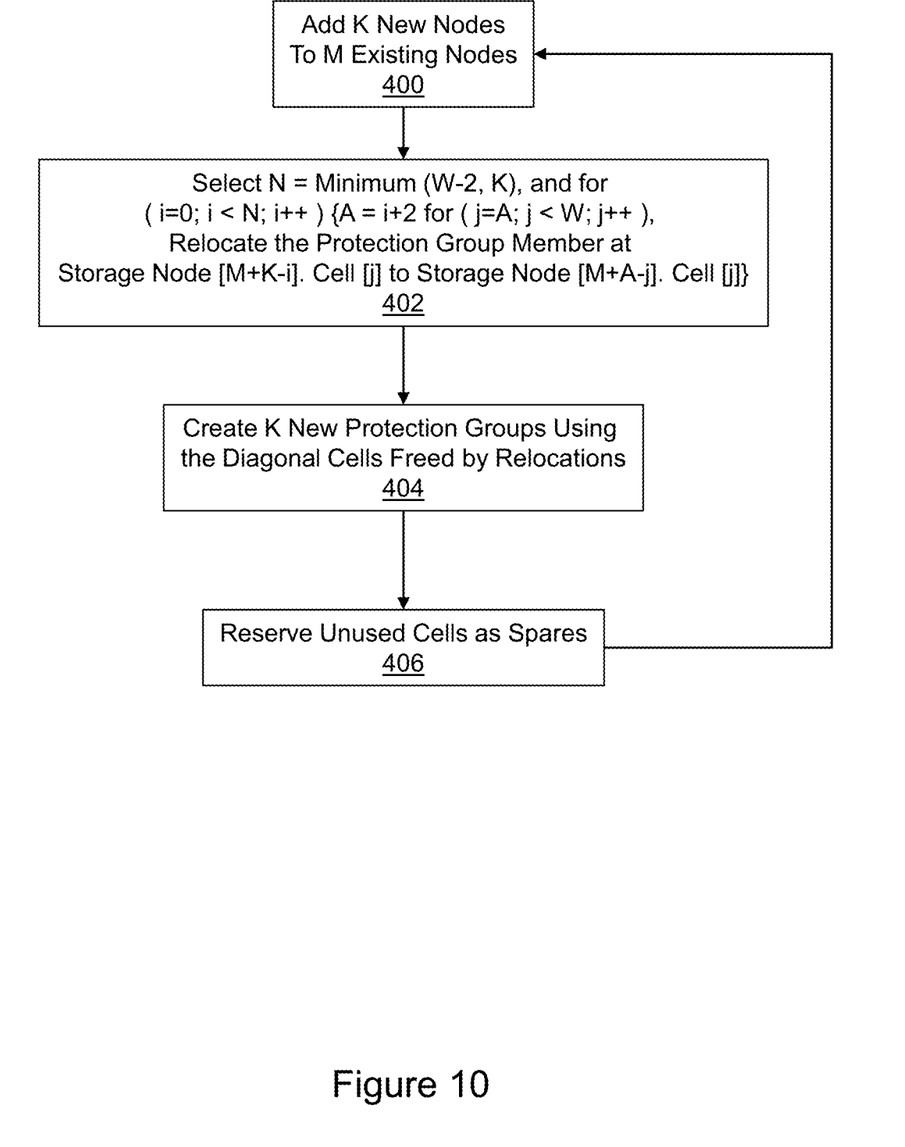
FIG. 10 illustrates a method for adding multiple new storage nodes.

FIG. 10 illustrates a method for adding multiple new storage nodes. As indicated in step 400, K new storage nodes are added to a system with M storage nodes. As indicated in step 402, N is selected as the lesser of W−2 and K. Then, for incremental values of i less than N and incremental values of j less than W, starting with i=0 and j=A, the protection group member at storage node [M+K−i]. cell [j] is relocated to storage node [M+A−j]. cell [j]. The result of the relocations is adjacent groups of diagonally-oriented free cells. Step 404 is creating K new protection groups using the adjacent groups of diagonally-oriented free cells. The new protection groups, from upper to lower, are assigned the next incremental protection group numbers. Step 406 is reserving the unused cells as spares. Steps 400 through 406 may be iterated for additional new nodes.

Figure 11:
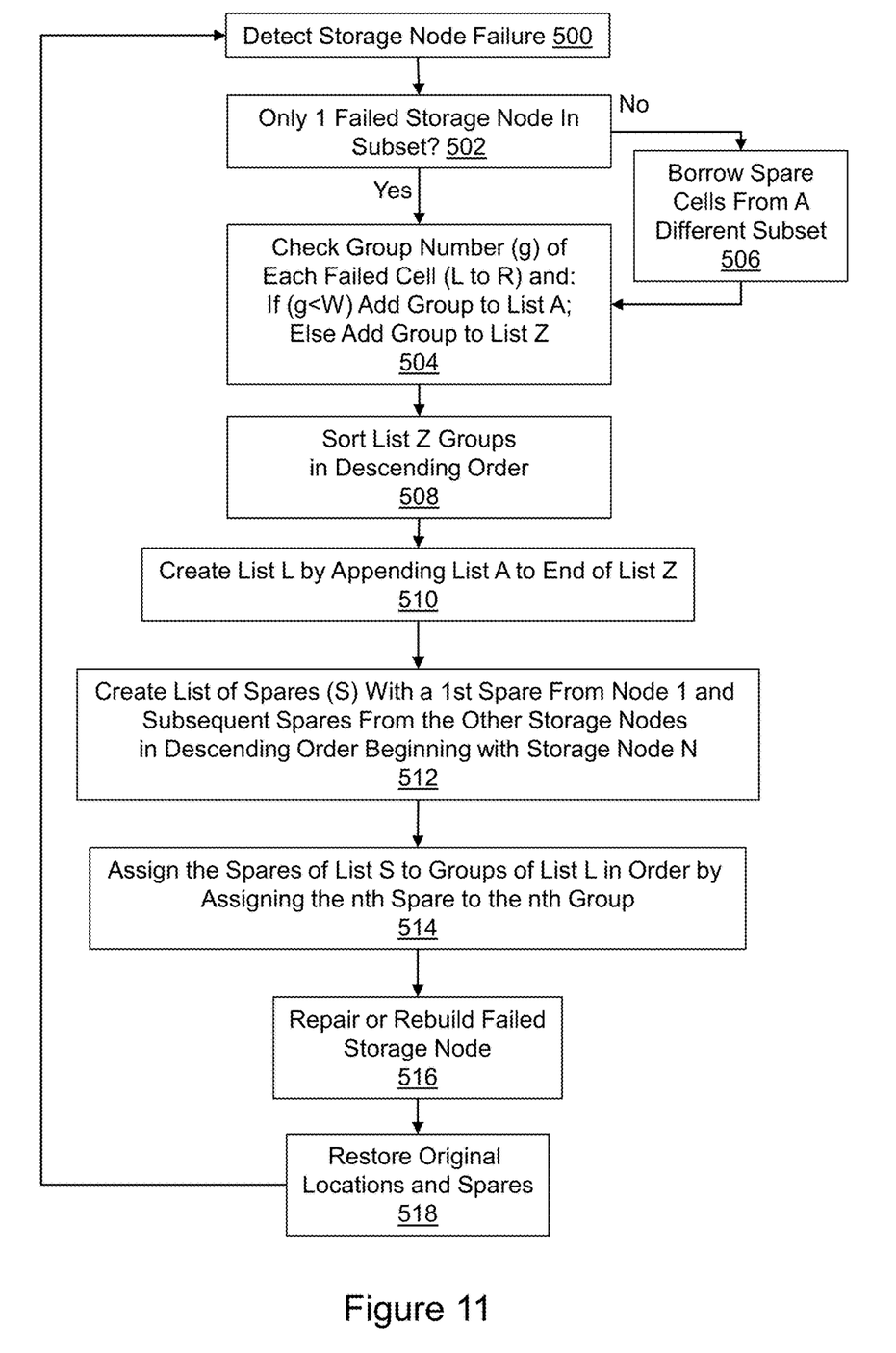
FIG. 11 illustrates a method for recovering from storage node failure.

FIG. 11 illustrates a method for recovering from node failure. Failure of a storage node is detected by the SDCs and/or SDSs in step 500. In the case in which there is only one failed storage node in the subset, as determined in step 502, then the spare cells of that subset are used for rebuilding the protection group members of the failed storage node. In the case in which there is already an existing failed storage node in the subset, as determined in step 502, then the spare cells of a different subset are borrowed to be used for rebuilding the protection group members of the failed storage node as indicated in step 506. Step 504 is checking the protection group number (g) of each failed cell from left to right in the matrix model and adding that protection group to list A if g is less than W; otherwise adding the protection group to list Z. List A is naturally sorted with the protection groups in ascending order by index number. Step 508 is sorting list Z by protection group number in descending order. Step 510 is creating a list L by appending the members of list A to the end of list Z. Step 512 is creating a list S of spare cells in order beginning with the first spare cell from node 1 and proceeding with the spare cells of other storage nodes in descending order beginning with storage node N. The spare cells of list S are assigned to protection groups of list L in order by assigning the nth spare in list S to the nth protection group in list L. The protection groups are then rebuilt in the assigned spare cells. Eventually, the failed storage node is repaired or rebuilt as indicated in step 516. Responsive to rebuild or repair of the failed storage node, the original protection group member locations and spares are restored by relocations as indicated in step 518.

Although no specific advantages should be viewed as limiting the inventive aspects, at least some of the disclosed aspects offer improvements such as efficient use of storage resources and reduction or minimization of data movement. Non-deterministic heuristics and metadata are often required to manage the space of a resilient data storage system with RAID or Erasure Coding groups. The disclosed aspects based on deterministic algorithms achieve full (100%) space efficiency with minimum metadata requirement, as the space allocation and assignment can be calculated. The cells are fully utilized for member cells of RAID or EC protection groups and spare capacity, without unusable "wasted" cells, because of deterministic algorithm-based space management.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A storage system comprising:
   a plurality of storage nodes each comprising at least one processor, volatile memory, and at least one non-volatile drive, wherein all of the storage nodes have equal non-volatile storage capacity that is subdivided into equal size cells; and
   a plurality of protection groups each having members stored in ones of the cells such that each cell contains no more than one of the members and the members are distributed across the storage nodes such that no more than one member of any single protection group is stored by any one of the storage nodes.

2. The storage system of claim 1 comprising spare cells for rebuilding protection group members of a failed one of the storage nodes.

3. The storage system of claim 2 wherein a conceptual W cell by W storage node matrix has a last storage node N and W is a first diagonal group of the matrix, and comprising a component configured to perform node failure recovery by:
   checking group number g of each failed cell from left to right and:
   if g is less than W then adding the group to list A, else adding the group to list Z;
   sorting list Z so that the groups are in descending order;
   creating a list L by appending list A to the end of list Z;
   creating a list of spares (S) with a 1st spare from node 1 and subsequent spares from the other storage nodes in descending order beginning with storage node N; and
   assigning the spares of list S to groups of list L in order by assigning the nth spare to the nth group.

4. The storage system of claim 1 comprising a conceptual matrix of W cell indices and W storage nodes, where each of the protection groups has D data members and P parity members and W=D+P.

5. The storage system of claim 4 wherein the storage nodes are consecutively indexed with numbers for each new storage node numbered N added to the storage system, for incremental values of integer i which are less than W, starting with i=2, the protection group member at storage node [N+1−i]. cell [i] is relocated to storage node [N]. cell [i].

6. The storage system of claim 5 wherein a new protection group is created in cells freed by relocation of protection group members.

7. The storage system of claim 6 wherein unused cells are reserved as spare cells.

8. The storage system of claim 4 comprising a component configured responsive to addition of multiple storage nodes at once to create new groups using diagonal cells of the matrix that become free after relocating vertically distributed members of original groups.

9. A method implemented by a plurality of storage nodes each comprising at least one processor, volatile memory, and at least one non-volatile drive, wherein all of the storage nodes have equal non-volatile storage capacity, comprising:
   subdividing the storage capacity into equal size cells; and
   creating a plurality of protection groups each having members stored in ones of the cells such that each cell contains no more than one of the members and the members are distributed across the storage nodes such that no more than one member of any single protection group is stored by any one of the storage nodes.

10. The method of claim 9 comprising maintaining spare cells for rebuilding protection group members of a failed one of the storage nodes.

11. The method of claim 10 comprising, with a conceptual W cell by W storage node matrix in which N is a last storage node of the matrix and W is a first diagonal group of the matrix, performing node failure recovery by:
   checking group number g of each failed cell from left to right and:
   if g is less than W then adding the group to list A, else adding the group to list Z;
   sorting list Z so that the groups are in descending order;
   creating a list L by appending list A to the end of list Z;
   creating a list of spares (S) with a 1st spare from node 1 and subsequent spares from the other storage nodes in descending order beginning with storage node N; and
   assigning the spares of list S to groups of list L in order by assigning the nth spare to the nth group.

12. The method of claim 9 comprising modeling the storage capacity as a conceptual matrix of W cell indices and W storage nodes, where each of the protection groups has D data members and P parity members and W=D+P.

13. The method of claim 12 comprising, for each new storage node N added to the storage system, for incremental values of integer i which are less than W, starting with i=2, relocating the protection group member at storage node [N+1−i]. cell [i] to storage node [N]. cell [i].

14. The method of claim 13 comprising creating a new protection group in cells freed by relocating protection group members.

15. The method of claim 14 comprising reserving unused cells as spare cells.

16. The method of claim 12 comprising adding multiple storage nodes at once and creating new groups using diagonal cells of the matrix that become free after relocating vertically distributed members of original groups.

17. An apparatus comprising:
one of a plurality of storage nodes each comprising at least one processor, volatile memory, and at least one non-volatile drive, wherein all of the storage nodes have equal non-volatile storage capacity that is subdivided into equal size cells; and
a plurality of protection groups each having members stored in ones of the cells of the one of the storage nodes such that each cell contains no more than one of the members and such that no more than one member of any single protection group is stored by the one of the storage nodes.

18. The apparatus of claim 17 comprising a component configured, for each new storage node N, for incremental values of integer i which are less than W, starting with i=2, to relocate the protection group member at storage node [N+1−i]. cell [i] to storage node [N]. cell [i].

19. The apparatus of claim 17 comprising a component configured responsive to addition of multiple new storage nodes at once to create new groups using diagonal cells of a matrix that become free after relocating vertically distributed members of original groups.

20. The apparatus of claim 17 wherein total storage capacity is modeled as a conceptual W cell by W storage node matrix having a last storage node N and a first diagonal group W, and comprising a component configured to perform failure recovery of another node by:
checking group number g of each failed cell from left to right and:
if g is less than W then adding the group to list A, else adding the group to list Z;
sorting list Z so that the groups are in descending order;
creating a list L by appending list A to the end of list Z;
creating a list of spares (S) with a 1st spare from node 1 and subsequent spares from the other storage nodes in descending order beginning with storage node N; and
assigning the spares of list S to groups of list L in order by assigning the nth spare to the nth group.

* * * * *